US012699211B2

(12) United States Patent
Newcomb et al.

(10) Patent No.: US 12,699,211 B2
(45) Date of Patent: Aug. 4, 2026

(54) HERMETIC SEALING FOR PROTECTION OF TITANIA-CONTAINING OPTICAL DEVICES FROM DAMAGE BY LIGHT

(71) Applicant: Addison Clear Wave Coatings, Inc., St. Charles, IL (US)

(72) Inventors: Martin Newcomb, Glen Ellyn, IL (US); Chau Ha, Glen Ellyn, IL (US)

(73) Assignee: ADDISON CLEAR WAVE COATINGS, INC., St. Charles, IL (US)

( * ) Notice: Subject to any disclaimer, the term of this patent is extended or adjusted under 35 U.S.C. 154(b) by 68 days.

(21) Appl. No.: 19/022,067

(22) Filed: Jan. 15, 2025

(65) Prior Publication Data

US 2026/0202586 A1     Jul. 16, 2026

(51) Int. Cl.
    *G02B 1/14*          (2015.01)
(52) U.S. Cl.
    CPC ..................................... *G02B 1/14* (2015.01)
(58) Field of Classification Search
    CPC ....................................................... G02B 1/14
    See application file for complete search history.

(56) References Cited

U.S. PATENT DOCUMENTS

| | | |
|---|---|---|
| 5,106,671 A | 4/1992 | Amberger et al. |
| 5,171,414 A | 12/1992 | Amberger et al. |
| 5,234,748 A | 8/1993 | Demiryont et al. |
| 5,245,468 A | 9/1993 | Demiryont et al. |
| 5,981,048 A | 11/1999 | Sugimoto et al. |
| 6,265,075 B1 | 7/2001 | Mccurdy et al. |
| 6,366,013 B1 | 4/2002 | Leenders et al. |
| 6,372,354 B1 | 4/2002 | Park et al. |
| 6,393,185 B1 | 5/2002 | Deacon |
| 6,548,912 B1 | 4/2003 | Graff et al. |
| 6,756,731 B1 | 6/2004 | Sano |
| 7,016,560 B2 | 3/2006 | Ticknor et al. |
| 7,268,486 B2 | 9/2007 | Ottermann et al. |

(Continued)

FOREIGN PATENT DOCUMENTS

| | | | |
|---|---|---|---|
| EP | 3190083 B1 | 8/2020 | |
| WO | WO-02102733 A1 * | 12/2002 | ................ H01J 9/02 |

(Continued)

OTHER PUBLICATIONS

Translation of JP2003002692 (Year: 2003).*

*Primary Examiner* — Sonya M Sengupta

(57)     ABSTRACT

An optical device coated with a high refractive index (RI) titania-containing resin is hermetically sealed to prevent degradation induced by short wavelength visible light (<425 nm) and UV light in the range 300-400 nm thus including sunlight. The method includes placing the optical device in an assembly that is capable of being sealed hermetically. The method further includes introducing an inert atmosphere or vacuum, and sealing the assembly hermetically such that oxygen and water are excluded. The produced hermetically sealed optical device obtains enhanced resistance to photochemical degradation due to exposure to sunlight and more general light with the wavelength range of 300-425 nm. This method disclosed significantly increases the operational lifespan of optical devices utilizing high refractive index titania-containing resins that will be exposed to sunlight.

20 Claims, 3 Drawing Sheets

(56) References Cited

U.S. PATENT DOCUMENTS

| | | | |
|---|---|---|---|
| 7,830,086 | B2 | 11/2010 | Adachi et al. |
| 7,939,838 | B2 | 5/2011 | Tanaka et al. |
| 7,982,398 | B2 | 7/2011 | Koo et al. |
| 8,029,152 | B2 | 10/2011 | Sekine et al. |
| 8,035,236 | B2 | 10/2011 | Hawker |
| 8,164,191 | B2 | 4/2012 | Nakamura |
| 8,299,706 | B2 | 10/2012 | Otterman et al. |
| 8,343,575 | B2 | 1/2013 | Dubrow |
| 8,592,511 | B2 | 11/2013 | Gonen Williams |
| 9,359,689 | B2 | 6/2016 | Xu et al. |
| 9,831,466 | B2 | 11/2017 | Savas et al. |
| 10,385,464 | B2 | 8/2019 | Rantala |
| 2003/0082399 | A1 | 5/2003 | He et al. |
| 2005/0106333 | A1 | 5/2005 | Lehmann et al. |
| 2005/0196552 | A1 | 9/2005 | Lehmann et al. |
| 2006/0240232 | A1 | 10/2006 | Faris |
| 2006/0275627 | A1 | 12/2006 | Biteau et al. |
| 2007/0178315 | A1 | 8/2007 | Thomas et al. |
| 2008/0028984 | A1 | 2/2008 | Meredith et al. |
| 2009/0081594 | A1 | 3/2009 | Chen et al. |
| 2010/0291364 | A1 | 11/2010 | Kourtakis et al. |
| 2010/0297433 | A1 | 11/2010 | Kourtakis et al. |
| 2011/0073174 | A1 | 3/2011 | Varaprasad |
| 2012/0081792 | A1 | 4/2012 | Neuffer |
| 2013/0177751 | A1 | 7/2013 | Oh et al. |
| 2013/0221279 | A1 | 8/2013 | Xu et al. |
| 2014/0322549 | A1 | 10/2014 | Xu et al. |
| 2015/0203709 | A1 | 7/2015 | Cooper et al. |
| 2016/0266281 | A1 | 9/2016 | Marshall et al. |
| 2017/0123107 | A1 | 5/2017 | Cho et al. |
| 2017/0204000 | A1 | 7/2017 | Varanasi et al. |
| 2017/0343704 | A1 | 11/2017 | Kim et al. |
| 2018/0219034 | A1 | 8/2018 | Fan et al. |
| 2018/0223107 | A1 | 8/2018 | Monickam et al. |
| 2018/0231688 | A1 | 8/2018 | Byun et al. |
| 2018/0231690 | A1 | 8/2018 | Byun et al. |
| 2019/0055412 | A1 | 2/2019 | Monickam et al. |
| 2019/0154881 | A1 | 5/2019 | Katzman et al. |
| 2020/0247073 | A1 | 8/2020 | Rao et al. |
| 2020/0348450 | A1 | 11/2020 | Byun et al. |
| 2021/0033751 | A1 | 2/2021 | Hart et al. |
| 2021/0278568 | A1 | 9/2021 | Yanagawa et al. |
| 2021/0325570 | A1 | 10/2021 | Reynolds et al. |
| 2021/0333437 | A1 | 10/2021 | Cangemi et al. |
| 2021/0341649 | A1 | 11/2021 | Lim et al. |
| 2022/0120952 | A1 | 4/2022 | Kim et al. |
| 2022/0153635 | A1 | 5/2022 | Ni et al. |
| 2022/0381954 | A1 | 12/2022 | Byun et al. |
| 2023/0003921 | A1 | 1/2023 | Byun et al. |
| 2023/0144879 | A1 | 5/2023 | Suzuki et al. |
| 2023/0150245 | A1 | 5/2023 | Kazuya et al. |
| 2023/0161077 | A1 | 5/2023 | Huang et al. |
| 2023/0229037 | A1 | 7/2023 | Takemoto et al. |
| 2023/0236499 | A1 | 7/2023 | Ha et al. |
| 2023/0417953 | A1 | 12/2023 | Kundaliya et al. |
| 2024/0069265 | A1 | 2/2024 | Gao et al. |
| 2024/0191056 | A1 | 6/2024 | Guschl et al. |
| 2024/0393503 | A1 | 11/2024 | Wako |

FOREIGN PATENT DOCUMENTS

| | | |
|---|---|---|
| WO | 2017023642 A1 | 2/2017 |
| WO | 2017136711 A1 | 8/2017 |

* cited by examiner

HERMETIC SEALING FOR PROTECTION OF TITANIA-CONTAINING OPTICAL DEVICES FROM DAMAGE BY LIGHT

TECHNICAL FIELD

The present disclosure relates generally to optical device protection and more particularly to methods for enhancing the durability of titania-containing coatings in optical applications.

BACKGROUND

Optical devices for professional and personal use, waveguides, and lens of cameras and detectors often employ high refractive index (RI) materials to permit thin lenses and wide field of view (FOV) for the device. High refractive index glasses and plastics (RI >2.0 at 589 nm) are available, and when features are needed on the high RI material as with waveguides, etching a pattern on the substrate is a costly approach. An economical alternative to etching is to imprint a nanometer-scale pattern using a technique known as nano-imprint lithography (NIL) where a resin is coated on the substrate, imprinted with a master or stamper, and cured by heat or light. Commonly, the curing is accomplished by UV light, and the process is then labeled UV-NIL. To avoid reflections, the NIL resin should match the RI of the substrate material as closely as possible, and NIL resins with RI approaching or 2.0 are commercially available and those with higher RI might soon be commercial.

High RI resins also may be employed as sub-micron thickness layers in devices such as in anti-reflective layers in optical devices. Anti-reflective layers are produced from thin films of high and low refractive index materials that can establish cancelations of reflecting light waves.

High RI resins used in NIL processes or as thin coatings commonly consist of a polymerizable base material containing small (<50 nm) titanium dioxide-based nano-particles (NPs). The high RI is imparted from the titania ($TiO_2$ or titanium dioxide) which in its most common forms has a refractive index of 2.5-2.7 at 589 nm. Titania-based NPs are formed by sol-gel methods or by crushing, and the NPs used in the high RI resins typically contain organic "capping" agents that prevent agglomeration and, in some cases, can polymerize with the base materials.

Although straight-forward for design purposes, high RI resins containing titania or titania-based NPs have significant drawbacks. The band-gap for $TiO_2$ is 3.0-3.2 eV, and $TiO_2$ absorbs short wavelength visible light (<425 nm) and a portion of the UV component of sunlight that reaches the Earth's surface (i.e. 300-400 nm); accordingly, light in the 300-425 nm range is absorbed by titania resulting in promotion of an electron from the valence band to the conductance band The excited state titania thus formed can relax back to the ground state (a process termed recombination), or it can react in electron transfer or redox reactions that can lead to radical formation. The photo-reactivity of $TiO_2$ typically results in rapid degradation of the high RI resin film when exposed to short wavelength visible light and UV light in sunlight. The degradation is manifested as a loss of mass, a change in RI, and often an alteration of the cured material from a solid to a tacky or semi-solid material. In practice, high RI titania-containing resins can degrade within days of average sunlight exposure, preventing their use in devices that will be exposed to sunlight.

It is thus desirable to employ a method for extending the life of high refractive index titania-containing and titania NP-containing resins in sunlight such that devices employing the high RI titania resins may be used where they are exposed to short wavelength visible light and UV light from sunlight or other sources.

SUMMARY

In accordance with an aspect of the disclosure, a method is disclosed for hermetically sealing an optical device coated with a high refractive index (RI) titania-containing resin to prevent short wavelength visible light and UV sunlight-induced degradation. The method comprises placing the optical device in an assembly configured for hermetical sealing and ensuring that the assembly containing the optical device is in an oxygen- and water-free environment having an atmosphere consisting of at least one of an inert gas, inert gases, or a vacuum. The method further comprises sealing the assembly and producing a hermetic seal.

In accordance with another aspect of the disclosure, a method is disclosed for protecting a device with thin films containing titanium dioxide from degradation induced by short wavelength visible light (<425 nm) and UV light in the range 300-400 nm. The method comprises placing the optical device in an assembly configured for hermetical sealing and ensuring that the assembly containing the optical device is in an oxygen- and water-free environment having an atmosphere consisting of at least one of an inert gas, inert gases, or a vacuum. The method further comprises sealing the assembly and producing a hermetic seal.

In accordance with another aspect of the disclosure, a method is disclosed for protecting an optical device employing a high refractive index (RI) titania-containing resin used in nano-imprint lithography (NIL) from damage by short wavelength visible light (<425 nm) and UV light in the range of 300-400 nm. The method comprises placing the optical device in an assembly configured for hermetical sealing and ensuring that the assembly containing the optical device is in an oxygen- and water-free environment having an atmosphere consisting of at least one of an inert gas, inert gases, or a vacuum. The method further comprises sealing the assembly and producing a hermetic seal.

This method and other aspects and features of the present disclosure will be better understood upon reading the following detailed description when read in conjunction with the accompanying drawings.

The figures depict one embodiment of the presented invention for purposes of illustration only. One skilled in the art will readily recognize from the following discussion that alternative embodiments of the structures and methods illustrated herein may be employed without departing from the principles described herein.

DETAILED DESCRIPTION

Figure 1:
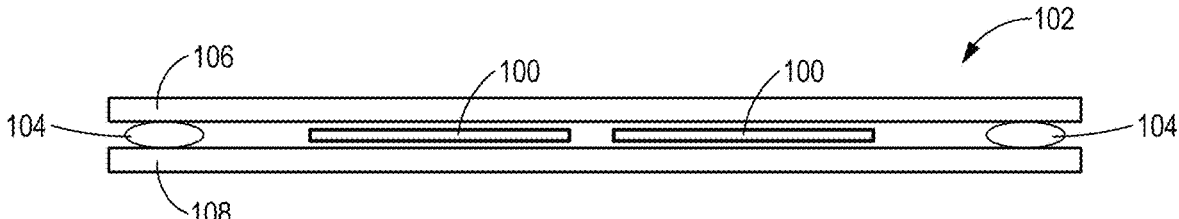
FIG. 1 is a side view schematic for a hermetically sealed device, according to an embodiment of the disclosure.
Figure 2:
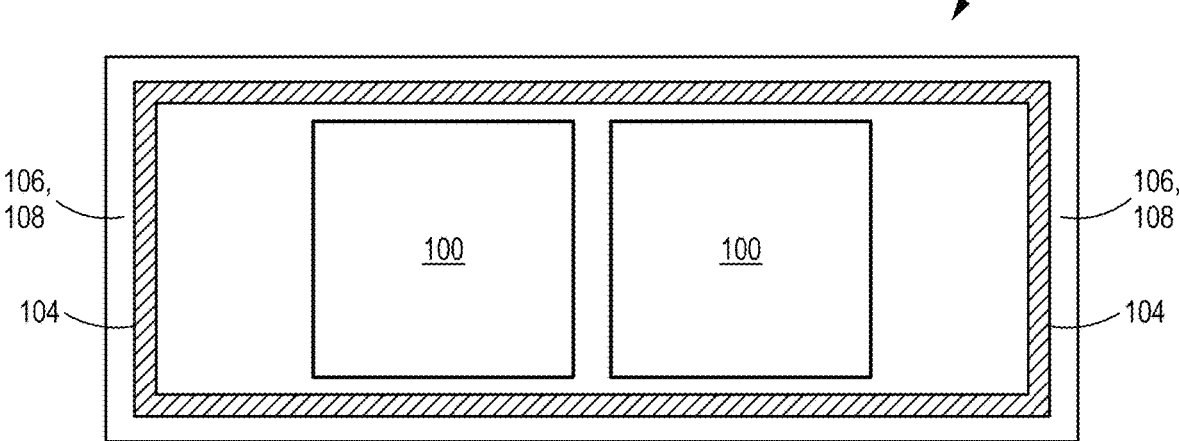
FIG. 2 is a top view schematic of the hermetically sealed device of FIG. 1, according to an embodiment of the disclosure.

Referring now to the drawings, and with specific reference to the hermetically sealed optical device illustrated in FIG. 1, an optical device 100 coated with a high refractive index ("RI") resin sealed in a assembly 102 using a hermetic sealing agent 104 is disclosed. FIG. 1 illustrates a side-view cross section of the optical device 100 in the assembly 102, according to an embodiment of the disclosure. FIG. 2 illustrates a top-view cross-section of the optical device 100 in the assembly 102 of FIG. 1, according to an embodiment of the disclosure. The assembly 102 may be a case configured for hermetic sealing.

FIGS. 1 and 2 illustrate the optical device 100 which is coated with a high RI titania-containing or titania NP-containing resin enclosed within the assembly 102 between a first plate 106 and a second plate 108. Plates 106 and 108 may be fabricated from any of a variety of materials that prevent transfer of oxygen and water (i.e. glass, silicon, plastic, metal, or ceramic) with the only limitation being that one of the plates must be transparent or translucent such that the image within the case can be viewed. The hermetic sealing agent 104 surrounds the optical device 100, or a plurality of optical devices, between the first plate 106 and the second plate 108. The hermetic sealing agent 104 is applied to surround the optical device 100 to prevent intrusion of oxygen or water into the casing.

The short wavelength visible light and the UV components of sunlight are absorbed by titania-containing materials such as the high RI titania resin coated on the optical device 100. For these high RI titania resins, an excited state titania may react with any redox sensitive material including organic base materials of the high RI titania resin and organic capping agents on nanoparticles ("NPs"). This phenomenon results in "sunlight" photo-degradation of the high RI resins primarily due to reactions occurring between the excited state titania species with molecules of oxygen and/or water to give, initially, an oxygen radical anion that can be protonated to give a hydroperoxyl radical and/or a protonated hydroxyl radical that deprotonates to give a hydroxyl radical. The radicals thus formed may react with organic components of the medium leading to damage of the cured high RI resins.

Figure 3:
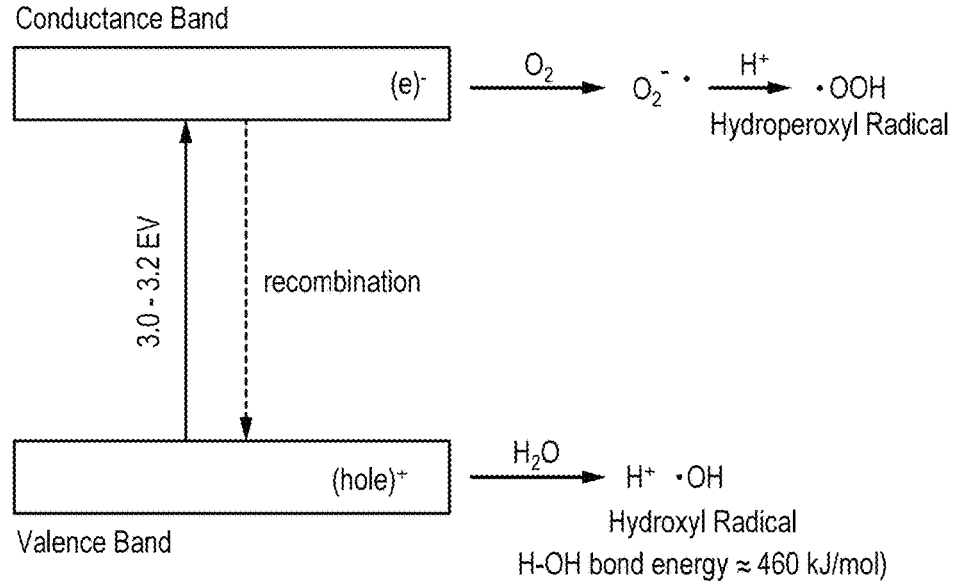
FIG. 3 is a model for excitation of titania by sunlight followed by reduction of oxygen and oxidation of water, according to an embodiment of the disclosure.

FIG. 3 illustrates the photocatalytic behavior of titanium dioxide ($TiO_2$) film or nanoparticles under ultraviolet (UV) light exposure. $TiO_2$, with a bandgap of 3.0-3.2 eV, absorbs short wavelength visible light (<425 nm) and UV light in the 300-400 nm wavelength range, promoting electrons from the valence band to the conduction band. This leaves positive holes ($h^+$) in the valence band. The excited electrons ($e^-$) can react with molecular oxygen ($O_2$) to form superoxide radicals ($O_2^-$), which further reacts with protons ($H^+$) to generate hydroperoxyl radicals ($\cdot OOH$). Concurrently, the positive holes ($h^+$) oxidize water ($H_2O$) to produce a hydroxyl radical ($\cdot OH$) and a proton. The radicals thus formed are highly reactive and can react with organic components in the resin.

The optical device 100 displays an extended lifetime in sunlight when hermetic sealing of the optical device 100 containing high RI titania-based or titania NP-based resin layers excludes oxygen and water. High RI titania-containing materials are generally stable to oxygen and water in the absence of short wavelength (<425 nm) visible light and 300-400 nm UV light, but not in the presence of such light. In the presence of such light, hermetic sealing imparts stability for high RI materials. Hermetic sealing of high RI titania-containing and titania NP-containing resins in the optical devices imparts orders of magnitude increases in sunlight stability; that is, the sunlight stability increases by three (3) or more orders of magnitude.

The hermetic sealing for titania-containing NIL and coating resins were tested in the following manner. High RI titania NP resins were coated on glass plates, also referred to as glass coupons. Both open and hermetically sealed samples prepared in a nitrogen atmosphere were exposed to artificial sunlight in a xenon arc lamp test chamber. Following various periods of irradiation, the samples were analyzed and changes in the RI and film thickness were measured.

More specifically, two types of high RI UV-NIL resins containing titania NPs were studied. One type of resin contained unshielded NPs, and the other type had NPs that contained an inorganic shield around the NP designed to protect the excited state titania at the molecular level. The latter types are commercial LuxNIL® U-series resins manufactured by Addison Clear Wave Coatings, Inc.

The resins containing solvent were spin coated on glass coupons, heated at 80-100° C. for 1 minute to remove solvent, irradiated in a nitrogen atmosphere with a 365 nm LED flood lamp system at 250 mW/$cm^2$ for 100 s, and then conditioned at 150° C. for 1-4 hours. The high RI resin films in these samples were 600-900 nm thick. The samples were analyzed for RI and thickness with a prism coupler.

Some optical devices were encased in glass cases sealed with Addison Clear Wave Coatings, Inc. UV-curable epoxy resin A1450-TX. This epoxy sealant has been used previously for hermetic sealing applications. The mounting procedure was conducted in a dry nitrogen atmosphere glove box in which the measured oxygen concentration was <0.1%.

Both unprotected and hermetically encased optical devices were irradiated in a Q-Sun® model Xe-1 xenon arc lamp test chamber (Q-Lab Corp.) using a Daylight Q filter. The resulting irradiation spectrum closely matches the spectrum of sunlight reaching the Earth's surface. The irradiance was set at 0.35 W/($m^2$ nm) at 340 nm which is the irradiance used in ASTM Method 5701 for testing photodegradable plastics with a xenon arc lamp apparatus (ref 1). This setting provides 365 W/($m^2$ nm) over the range 300-800 nm (ref 1) which is somewhat greater than two times the average amount of sunlight reaching the Earth's surface. At various times, coupons were removed from the test chamber, and the hermetically sealed samples were broken open. The RI and film thicknesses of the "open" hermetically sealed samples were measured.

Figure 4:
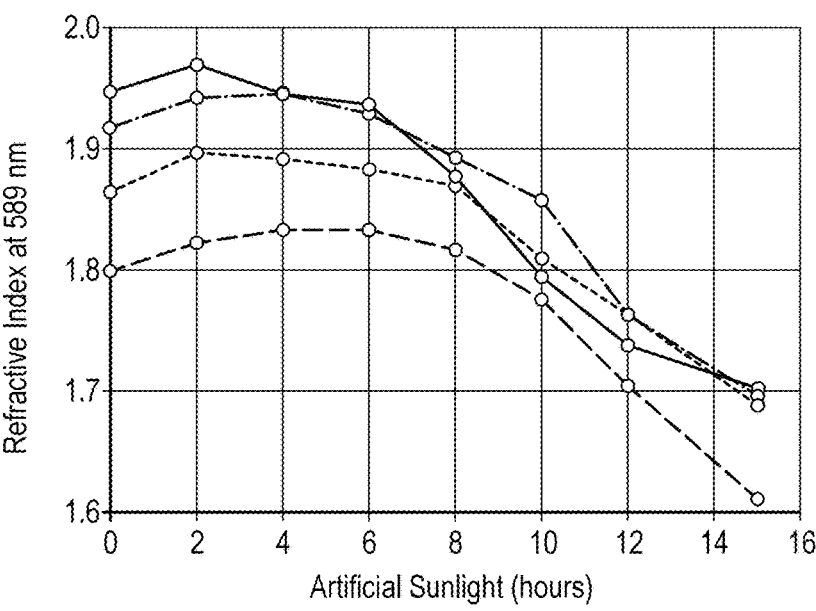
FIG. 4 is a diagram of a Refractive Index of resins with unshielded titania-containing nano-particles when exposed to artificial sunlight, according to an embodiment of the disclosure.
Figure 5:
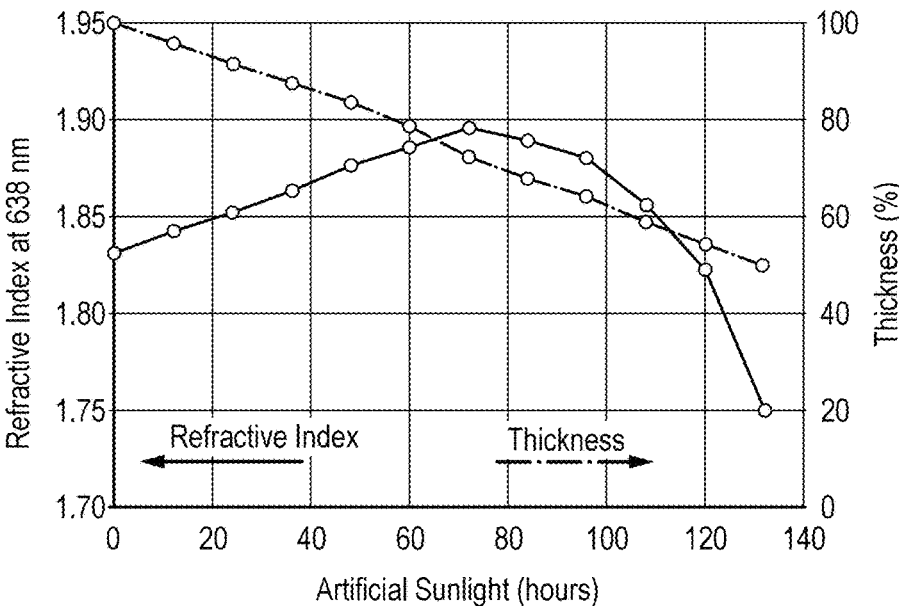
FIG. 5-7 are diagrams of the behavior of cured LuxNIL® resins when exposed to artificial sunlight, according to an embodiment of the disclosure.
Figure 6:
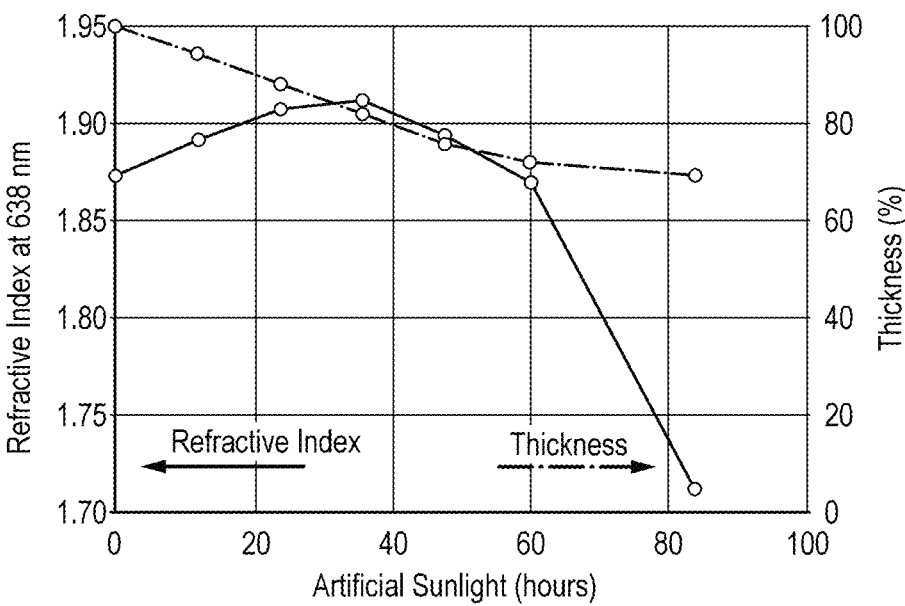
Figure 7:
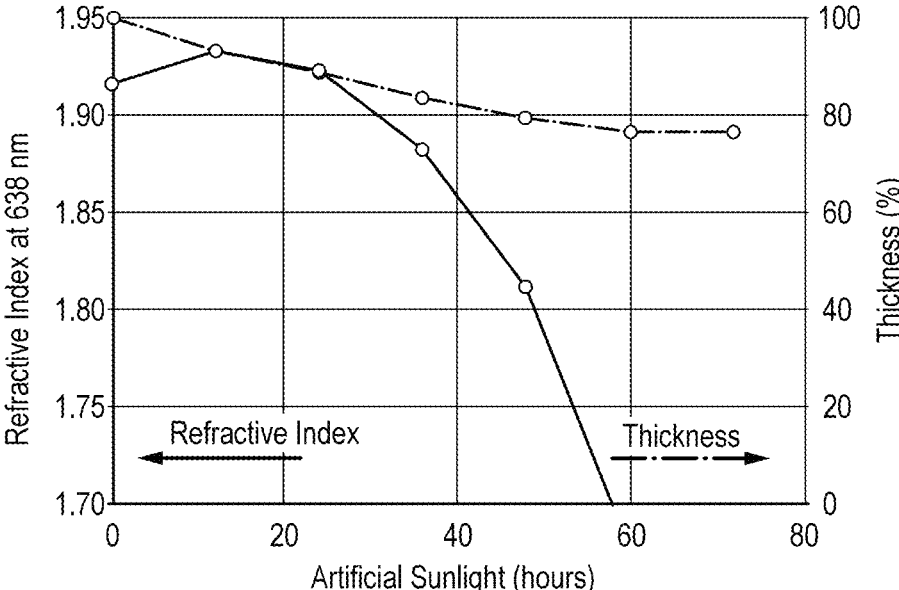

Now referring to FIGS. 4-7 which illustrate the results for unprotected, non-hermitically sealed samples. FIG. 4 is a diagram of the Refractive Indices of resins with unshielded titania-containing nano-particles when exposed to artificial sunlight; the $TiO_2$ in these resins has an anatase crystal structure. FIGS. 5-7 illustrate diagrams of the behavior of cured LuxNIL® resins when exposed to artificial sunlight; the $TiO_2$ in these resins have a rutile crystal structure. FIGS. 5-7 demonstrate the RI and the resin layer percent thickness as functions of hours of irradiation. Results for LuxNIL® P283-U are shown in FIG. 5. Results for LuxNIL® P285-U are shown in FIG. 6. Results for LuxNIL® P288-U are shown in FIG. 7.

As shown in FIG. 4, within a few hours of irradiation, the samples with unshielded titania NPs demonstrated an initial growth and subsequent reduction in the RI. As shown in FIGS. 5-7, the samples with shielded NPs demonstrated the same type of RI behavior, but the changes in RI were less rapid than those found for the unshielded NP samples. In addition, FIGS. 5-7 demonstrates the thicknesses of the resins was followed for the shielded NP samples, and loss of a considerable amount of material was observed over the course of the irradiations. In many cases, the samples were tacky at the point at which the RI was reduced by about 0.5 to 1.0 RI units. The ultimate reduction in RI and thickness as well as the ultimate formation of tacky or semi-solid material are indicators and manifestations of degradation of the high RI titania resin 106.

For the hermetically sealed samples, the behavior of the high RI titania-containing resins was much different. In these cases, very little change in RI and resin thicknesses were found after hundreds of hours of artificial sunlight irradiation. Table 1 provides results for hermetically sealed test samples made with titania-containing high RI resins. After multi-hundreds of hours of artificial sunlight irradiation, only small increases in the RI and slight decreases in the resin thicknesses were found. Using the initial rate of increase in the RI of the open samples as standards, the hermetically sealed samples demonstrated several orders of magnitude decrease in sunlight reactivity compared to the "open" samples; a crude estimate would be a three or more order of magnitude decrease in sunlight reactivity.

Several features of the sunlight exposure studies in Table 1 are noteworthy. One feature is that the hermetic sealing stability was found for the resins containing both anatase and rutile crystal structures of $TiO_2$ demonstrating that any natural polymorphic $TiO_2$-containing resin would be stabilized by hermetic sealing. In addition, both uncoated titania and titania coated with a layer of inorganic materials behaved similarly. Another important point is that the irradiance of the artificial sunlight used in the studies in Table 1 was greater than two times the average irradiance of sunlight that reaches the Earth's surface, and the irradiation was continuous as opposed to only an average of 12 hours per day of normal sunlight; thus 600 hours of irradiation in the studies performed here is equivalent to 100 days of exposure to average sunlight at the Earth's surface. Finally, it is noteworthy that the amount of degradation observed was so minor that it is possible that the lifetimes of the titania-containing resins would be extended to the lifetimes of the hermetic seals which are known in some cases to be for years.

TABLE 1

Results from Irradiation of Hermetically Sealed Samples.

| Resin[a] | Hours[b] | Wavelength[c] | Initial RI | Change in RI[d] | % thickness[d] |
|---|---|---|---|---|---|
| XX-85 | 622 | 589 nm | 1.906 | +0.010 | 97 |
| XX-89 | 622 | 589 nm | 1.954 | +0.009 | 97 |
| P283U | 606 | 638 nm | 1.831 | +0.008 | 100 |
| P285U | 606 | 638 nm | 1.877 | +0.008 | 100 |
| P285U | 622 | 589 nm | 1.890 | +0.008 | 98 |
| P288U | 622 | 589 nm | 1.928 | +0.014 | 100 |

[a]Resins with leading letters XX are test resins containing anatase $TiO_2$ NPs. The LuxNIL ® P283U, P285U and P288U resins contain rutile $TiO_2$ NPs.
[b]Hours of irradiation.
[c]Wavelength at which RI was measured.
[d]Values measured after irradiation.

What is claimed is:

1. A method for protecting an optical device coated with a high refractive index (RI) titania-containing resin from damage by short wavelength visible light (<425 nm) and UV light in the range of 300-400 nm, the method comprising:
   placing the optical device in an assembly configured for hermetical sealing;
   ensuring that the assembly containing the optical device is in an oxygen- and water-free environment having an atmosphere consisting of at least one of an inert gas, inert gases, or a vacuum;
   sealing the assembly; and
   producing a hermetic seal.

2. The method of claim 1, further comprising obtaining a light-stabilized optical device with a high RI titania-containing resin that maintains a refractive index change of no more than 0.10 RI units and at least 95% of its initial thickness after at least 1,000 hours of average sunlight irradiation at the Earth's surface.

3. The method of claim 1, wherein the high RI titania-containing resin has a refractive index of greater than 1.7 at 589 nm.

4. The method of claim 1, wherein the crystal structure of the titania is anatase or rutile.

5. The method of claim 1, wherein the titania is uncoated or coated with one or more inorganic materials.

6. The method of claim 1, wherein the high RI titania-containing resin comprises titanium oxide nanoparticles with an average particle size of less than 100 nanometers dispersed in an organic medium.

7. A method for protecting a device with thin films containing titanium dioxide from degradation induced by short wavelength visible light (<425 nm) and UV light in the range 300-400 nm, the method comprising:
   placing the device in an assembly configured for hermetical sealing;
   ensuring that the assembly containing the optical device is in an oxygen- and water-free environment having an atmosphere consisting of at least one of an inert gas, inert gases, or a vacuum;
   sealing the assembly; and
   producing a hermetic seal.

8. The method of claim 7, further comprising obtaining a light-stabilized optical device with a high RI titania-containing resin that maintains a refractive index change of no more than 0.10 RI units and at least 95% of its initial thickness after at least 1,000 hours of average sunlight irradiation at the Earth's surface.

9. The method of claim 7, wherein the high RI titania-containing resin has a refractive index of greater than 1.7 at 589 nm.

10. The method of claim 7, wherein the crystal structure of the titania is anatase or rutile.

11. The method of claim 7, wherein the titania is uncoated or coated with one or more inorganic materials.

12. The method of claim 7, wherein the high RI titania-containing resin comprises titanium oxide nanoparticles with an average particle size of less than 100 nanometers dispersed in an organic medium.

13. The method of claim 7, wherein the inert gas is nitrogen, argon, or helium.

14. A method for protecting an optical device employing a high refractive index (RI) titania-containing resin used in nano-imprint lithography (NIL) from damage by short wavelength visible light (<425 nm) and UV light in the range of 300-400 nm, the method comprising:
   placing the optical device in an assembly that configured for hermetical sealing;

ensuring that the assembly containing the optical device is in an oxygen- and water-free environment having an atmosphere consisting of at least one of an inert gas, inert gases, or a vacuum;

sealing the assembly; and producing a hermetic seal.

15. The method of claim 14, further comprising obtaining a light-stabilized optical device with a high RI titania-containing resin that maintains a refractive index change of no more than 0.10 RI units and at least 95% of its initial thickness after at least 1,000 hours of average sunlight irradiation at the Earth's surface.

16. The method of claim 14, wherein the high RI titania-containing resin has a refractive index of greater than 1.7 at 589 nm.

17. The method of claim 14, wherein the crystal structure of the titania is anatase or rutile.

18. The method of claim 14, wherein the titania is uncoated or coated with one or more inorganic materials.

19. The method of claim 14, wherein the high RI titania-containing resin comprises titanium oxide nanoparticles with an average particle size of less than 100 nanometers dispersed in an organic medium.

20. The method of claim 14, wherein the inert gas is nitrogen, argon, or helium.

\* \* \* \* \*